United States Patent [19]
Egglhuber

[11] Patent Number: 5,771,876
[45] Date of Patent: Jun. 30, 1998

[54] WIRE SAW FOR AND METHOD OF CUTTING OFF SLICES FROM A WORKPIECE

[75] Inventor: Karl Egglhuber, Hebertsfelden, Germany

[73] Assignee: Wacker Siltronic Gesellschaft für Halbleitermaterialien AG, Burghausen, Germany

[21] Appl. No.: 638,982

[22] Filed: Apr. 25, 1996

[30] Foreign Application Priority Data

May 26, 1995 [DE] Germany .................. 195 19 460.8

[51] Int. Cl.⁶ .................................................. B28D 1/02
[52] U.S. Cl. ........................................ 125/21; 125/16.02
[58] Field of Search ............................ 125/16.01, 16.02, 125/21, 17; 83/651.1; 451/334

[56] References Cited

U.S. PATENT DOCUMENTS

| | | |
|---|---|---|
| 3,032,026 | 5/1962 | Raabe .......................................... 125/21 |
| 4,105,012 | 8/1978 | Hini et al. ............................. 125/16.01 |
| 4,655,191 | 4/1987 | Wells et al. . |
| 4,766,875 | 8/1988 | Ieigelson . |
| 5,287,774 | 2/1994 | Seifert . |

FOREIGN PATENT DOCUMENTS

| | | |
|---|---|---|
| 0015423 | 9/1980 | European Pat. Off. . |
| 0522542 | 1/1993 | European Pat. Off. . |
| 906581 | 1/1946 | France . |
| 2328543 | 1/1974 | Germany . |
| 4400221 | 7/1994 | Germany . |
| 7237109 | 9/1995 | Japan . |
| 450260 | 11/1974 | Russian Federation . |
| 0605721 | 5/1978 | U.S.S.R. ............................. 125/16.01 |
| 9005053 | 5/1990 | WIPO . |
| 9112915 | 9/1991 | WIPO . |

OTHER PUBLICATIONS

Derwent Abstract for DE 23 28 543.
Derwent Abstract for SU 450260.
Derwent Abstract for EP 15423.
Derwent Abstract for DE 4400221.
Derwent Abstract for JP 07–237109.

Primary Examiner—Robert A. Rose
Attorney, Agent, or Firm—Collard & Roe, P.C.

[57] ABSTRACT

A wire saw for, and a method of, cutting off slices from a workpiece. The wire saw has a cutting head, which contains a plurality of wire guide rollers and around which a multiplicity of wire sections lying parallel to one another and forming plane wire webs are moved, a holding arm which carries the workpiece, and a feed, by means of which the wire sections of one of the wire frames cut through the workpiece while an auxiliary sawing medium is supplied. In one embodiment of the wire saw, the feed guide is arranged at the side of the cutting head and the holding arm can be swivelled parallel to the wire web. In another embodiment, holding arm is swivellable parallel to the wire web and the feed has a feed guide which guides the cutting head with the wire web toward the workpiece. For the purpose of a change of workpiece, the workpiece is transported by a holding arm carrying it from a sawing position above a wire web into a deposit position, the workpiece is released from the holding arm in the deposit position, a new workpiece is picked up from a pick-up position by the holding arm, and the new workpiece is transported by the holding arm into a sawing position above a wire web. The cutting head and a second cutting head may be used alternately for cutting off slices, in which the cutting head not in use is being prepared for future use while the other cutting head is currently in use.

20 Claims, 8 Drawing Sheets

WIRE SAW FOR AND METHOD OF CUTTING OFF SLICES FROM A WORKPIECE

BACKGROUND OF THE INVENTION

1. Field of the Invention

The present invention relates to a wire saw for cutting off slices from a workpiece, in particular for cutting off semiconductor slices from rod-shaped or block-shaped semiconductor material. The present invention also relates to sawing methods, for the implementation of which the wire saw is especially suitable.

2. The Prior Art

Wire saws of this type essentially comprise a cutting head having a plurality of wire guide rollers, of which at least one is driven and around which a multiplicity of wire sections lying parallel to one another and forming plane wire webs are moved, the workpiece being guided from above toward one of the wire webs by means of a feed and while an auxiliary sawing medium is supplied. The wire sections may be part of a single endless wire which is coiled around the cutting head and is wound from a supply spool onto a take-up spool.

U.S. Pat. No. 4,655,191 discloses a wire saw differing only slightly therefrom, in which a multiplicity of endless wires are provided and each wire section of a wire frame is allocated to one of these wires. EP-522,542 A1 also discloses a wire saw in which a multiplicity of endless wire loops run around the cutting head.

Figure 1:
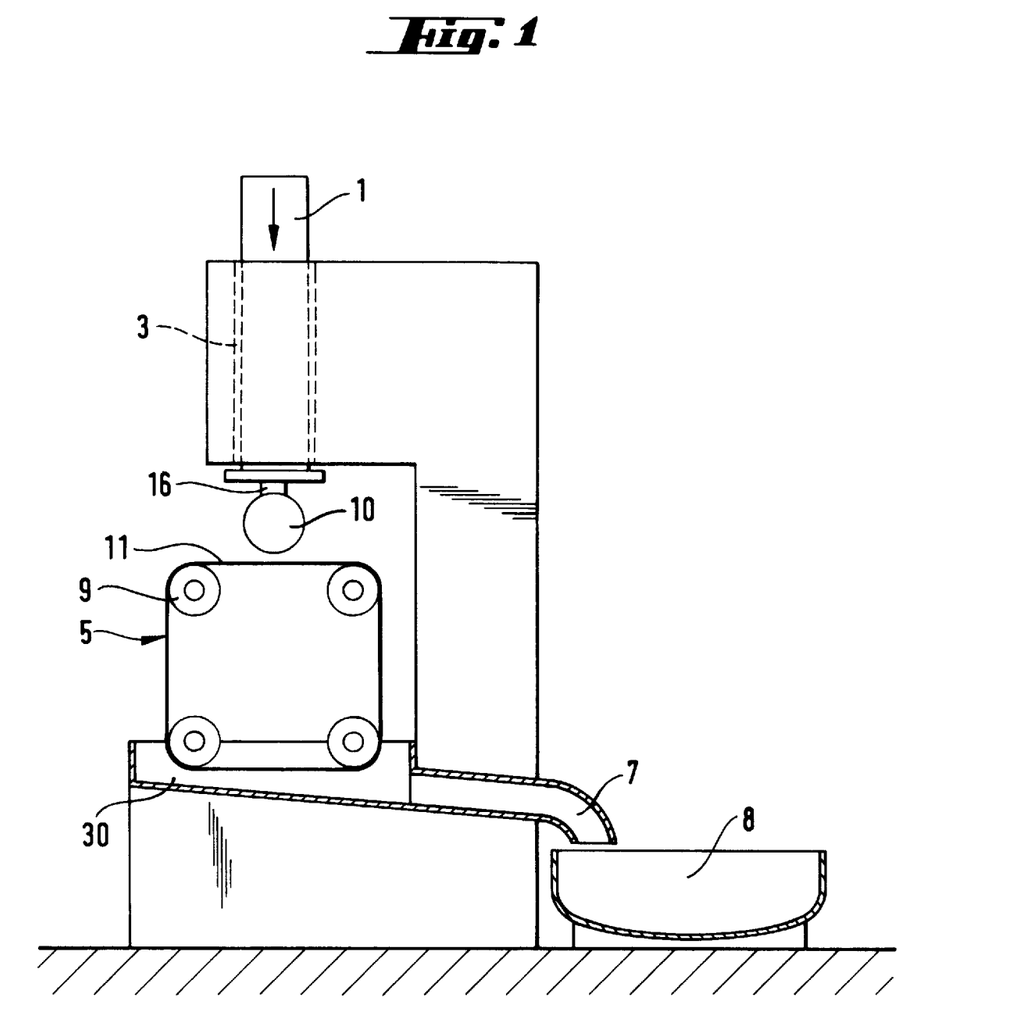
FIG. 1 shows prior art.

A wire saw of the prior art is schematically shown in FIG. 1. This figure shows a side view of the wire saw. The feed 1 comprises a workholder 16, which fixes the workpiece 10, and a feed guide 3 with which the workpiece is guided during the sawing in a linear movement from above toward the wire web 11 of the cutting head 5 while an auxiliary sawing medium is supplied. The auxiliary sawing medium generally consists of abrasive particles of hard material which are dispersed in a liquid. It is collected below the cutting head in a trough 30 and is conveyed in a channel 7 to a collecting tank 8. The arrangement of the machine parts shown in FIG. 1 is unfavorable from various points of view. Thus, the arrangement of the feed guide above the wire web has an unfavorable effect on the overall height of the wire saw. The wire saw becomes so large that problems occur during both transport and installation on account of its size. Therefore space has to be saved under the cutting head in order to ensure that the wire saw does not become even larger. This leaves hardly enough difference in level between the trough, the channel and the collecting tank, so that the particles of hard material settle in the trough and the channel and prevent further auxiliary sawing medium from flowing off. The arrangement of the feed guide above the wire web also obstructs the access to the wire web and to the workpiece. It is also responsible for the fact that a possibly necessary change of the wire sections or the wire guide rollers or fitting and removal of the workpiece require long downtimes, during which the wire saw cannot be put into operation.

SUMMARY OF THE INVENTION

It is an object of the present invention to provide a wire cutting which does not have the disadvantages mentioned and to provide a sawing method with which workpieces can be machined more effectively.

The above object is achieved according to the invention by providing a wire saw for cutting off slices from a workpiece, having a cutting head which contains a plurality of wire guide rollers and around which a multiplicity of wire sections lying parallel to one another and forming plane wire webs are moved, the workpiece being guided from above toward one of the wire webs by means of a feed while an auxiliary sawing medium is supplied, and the feed comprising a holding arm carrying the workpiece, wherein the feed is arranged at the side of the cutting head and the holding arm can be swivelled parallel to this wire frame.

Due to the fact that the feed guide is arranged laterally next to the cutting head, space is required above the wire web essentially only for the holding arm and the workpiece. The wire saw can thus be of more compact design in terms of overall height and the cutting head can be arranged at a higher level. There is more space left below the cutting head for a greater inclination of the channel so that the used auxiliary sawing medium can flow off safely into the collecting tank provided. Due to the swivelling holding arm, the change of workpiece is simplified and the wire web of the cutting head becomes freely accessible for maintenance work such as, for example, a wire change.

The machine frame of the wire saw and the supporting parts of the feed and the wire guide rollers are designed as heavy and mechanically sturdy parts, the temperature of which is preferably regulated by a coolant. The heat developing during the sawing operation has to be dissipated rapidly, especially during the production of semiconductor slices, in order to prevent temperature fluctuations from having an adverse effect on the geometry of the slices cut off from the workpiece. In this connection, reference may be made to patent application Ser. No. 19510625.3 filed at the German Patent Office on 23 Mar. 1995. This problem is described in more detail therein and in which a follow-up system for the wire sections is proposed. In a further development of the present invention, provision is made for the wire saw to be equipped with this follow-up system.

In a further embodiment of the invention, the feed is arranged at the side of and offset from the cutting head. This has the additional advantage that the cutting head is accessible from all sides and the inspection or the change of the wire guide rollers, for example, is not impaired by the presence of the feed.

In another embodiment of the invention, the wire saw is equipped with at least one further cutting head which is already prepared for sawing, while the first cutting head is still being used for cutting off slices. During a change of cutting head advisable for technical reasons, the prepared cutting head can immediately be used for machining further workpieces and the first cutting head can be repaired for further use. Downtimes of the wire saw which are caused by maintenance of the cutting head are thus drastically reduced.

Finally, a further embodiment of the invention provides for a control unit which induces and coordinates all machine movements, in particular movements of the feed and the cutting head, so that a high degree of automation is achieved.

The present invention also provides a method of cutting off slices from a workpiece by means of a wire saw having a cutting head, which contains a plurality of wire guide rollers and around which a multiplicity of wire sections lying parallel to one another and forming plane wire webs are moved, and a feed, by means of which the wire sections of one of the wire webs work through the workpiece while an auxiliary sawing medium is supplied wherein, for the purpose of a change of workpiece, the workpiece is transported by a holding arm carrying it from a sawing position above a wire web into a deposit position, the workpiece is released from the holding arm in the deposit position, a new workpiece is picked up from a pick-up position by the holding arm, and the new workpiece is transported by the holding arm into a sawing position above a wire web.

The sawing method simplifies the changing of the workpiece and may be carried out both with known wire saws and in particular with a wire saw according to the invention. This also applies to a further method embodiment according to the invention, wherein one cutting head and a second cutting head are used alternately for cutting off slices, such that the cutting head not in use is being prepared for use, while the other cutting head is in use.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 2A:
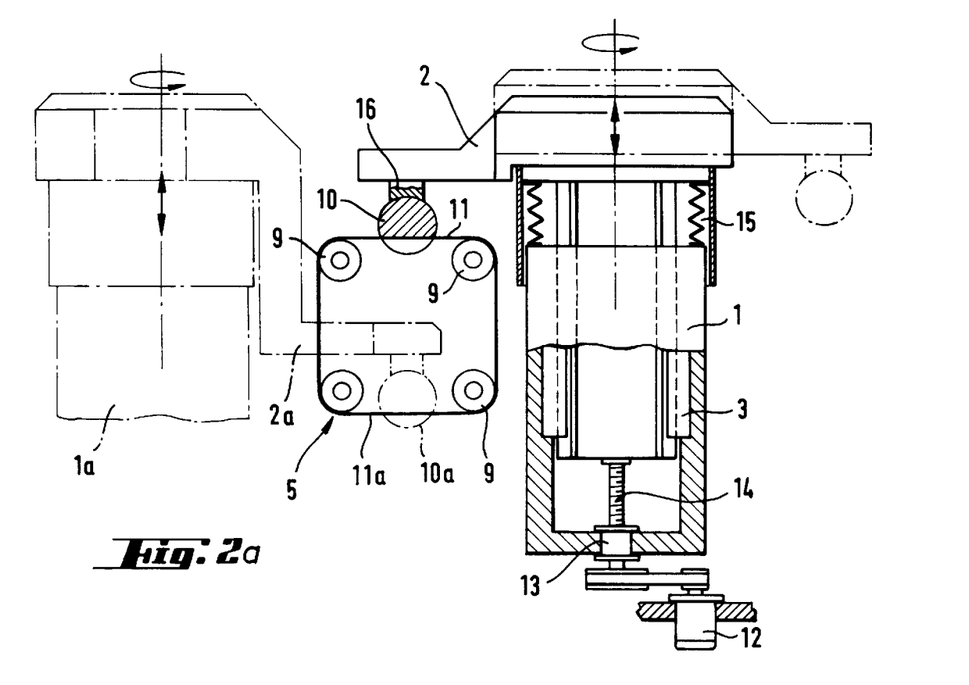
FIG. 2a shows a side view of a wire saw.

Turning now in detail to the drawings, the wire saw according to FIG. 2a comprises a cutting head 5 having four wire guide rollers 9 and a feed 1 having a feed guide 3 and a holding arm 2. The cutting head may also contain, for example, only three wire guide rollers, which are arranged in such a way that, when viewed in cross section, they lie at the corners of a triangle which stands on one of the triangular points. However, the cutting head may also contain only two or more than four wire guide rollers. The feed 1 stands at the side of the cutting head 5 opposite one of the four sides of the cutting head, either as shown in FIG. 2a or turned through 90° at the front ends of the wire guide rollers. The longitudinal axes of the wire guide rollers and the workpiece lie parallel to one another in both cases so that slices are cut off when the workpiece passes through the wire web.

The end part of the holding arm 2 to which the workpiece 10 is fastened projects right into the area which is located above the wire web 11, serving as sawing tool, of the cutting head. The feed guide 3 is designed as a linear guide and can be raised and lowered axially by means of the drive 12 and the spindle 14 mounted in the bearing part 13. The holding arm 2 mounted on the feed guide 3 is raised or lowered simultaneously during this movement. Bellows 15 protect the feed guide from contamination by the auxiliary sawing medium. The workpiece 10 is connected, for example adhesively bonded, to a workholder 16, which is detachably fastened to the holding arm 2. The fastening is preferably effected by a clamping device (not shown). The holding arm 2 of the wire saw can be swivelled parallel to the wire web 11. The axis of rotation of this rotary movement runs perpendicularly to the plane of the wire frame. The holding arm 2 swivels the workpiece 10 in a horizontal plane P FIG. 2a also indicates the position of the holding arm 2 after a rotation through 180°. The holding arm may be rotatably mounted on the feed guide. Another solution provides for the entire feed to be capable of being rotated, for example by it being mounted on a rotary plate. The rotary movement of the holding arm is effected by a drive (not shown). Furthermore, a clamping device is provided which enables the holding arm to be locked in certain positions, for example, in the sawing positions, in which the workpiece is located above the wire web. The clamping device is likewise omitted from the drawings.

When the feed guide 3 is lowered, the workpiece 10 is pressed against the wire web 11. With auxiliary sawing medium being supplied at the same time, the wire sections penetrate the workpiece and divide it into a multiplicity of slices lying next to one another. The slices are completely cut off from the workpiece when the wire sections have left the workpiece and penetrated the adjoining part of the workholder 16.

A further embodiment of the wire saw is equipped with a second feed 1a and a holding arm 2a so that a second workpiece 10 a can be sawed on the wire web 11a at the same time as the workpiece 10. Alternatively, this may also be achieved without a second feed by the holding arm 2 being designed in such a way that it can carry a second workpiece and can guide it toward the wire web 11a during the lowering.

Figure 2B:
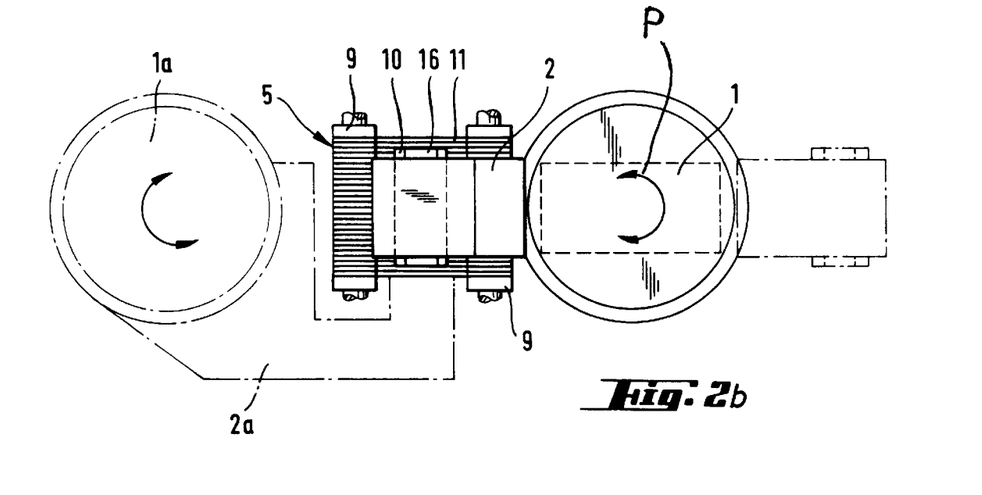
FIGS. 2b and 2c are plan views of the wire saw according to FIG. 2a, having two different arrangements of the feed at the side of the cutting head.
Figure 2C:
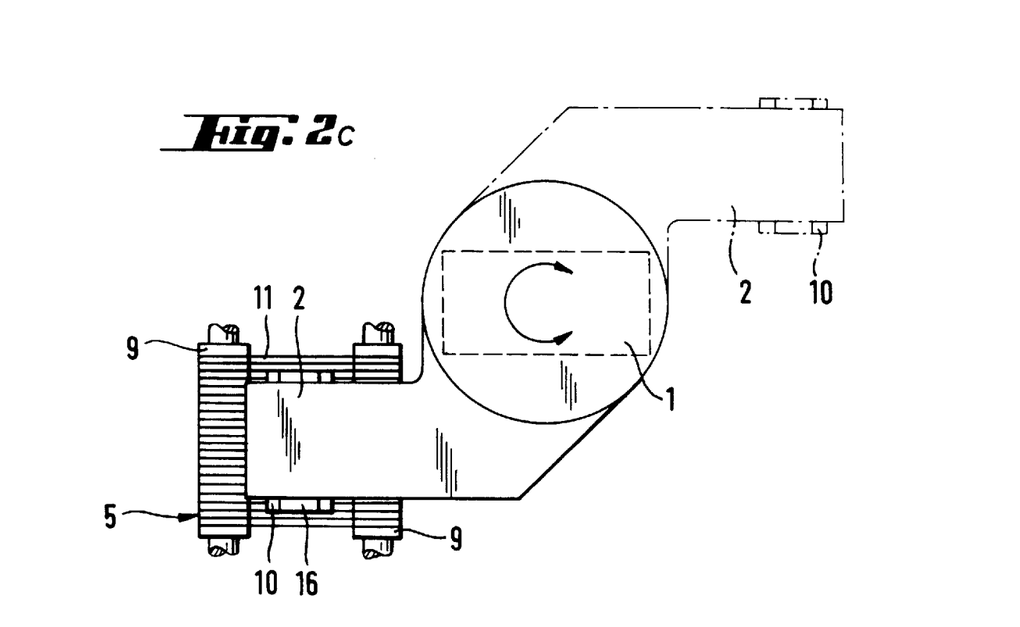
Figure 2D:
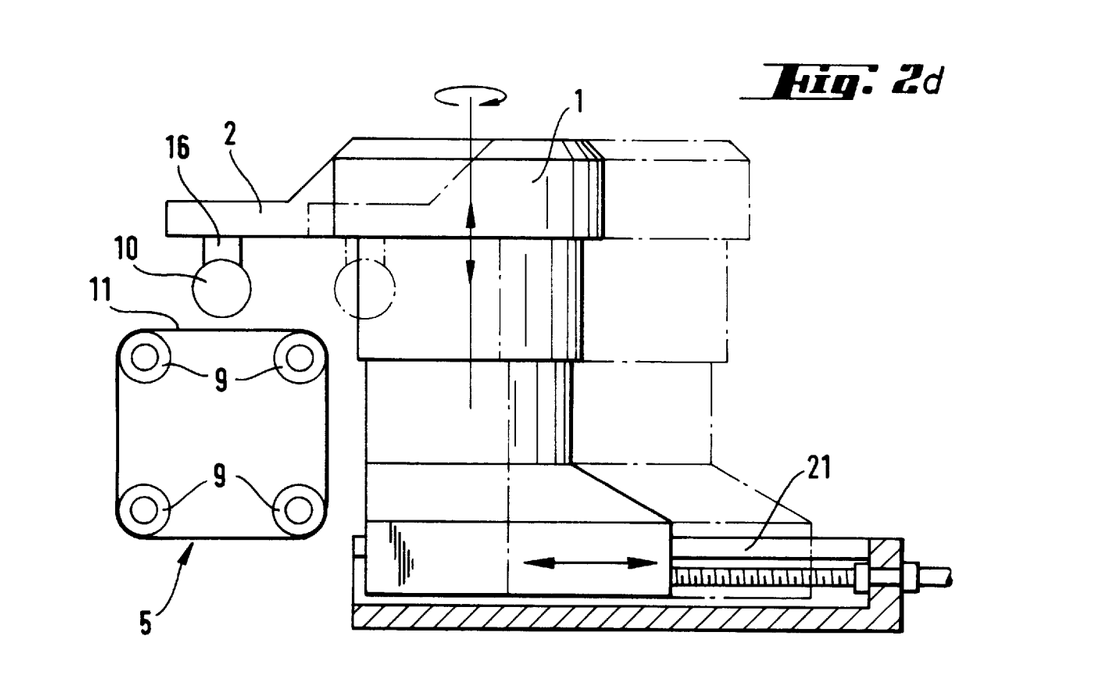
FIG. 2d shows a wire saw according to FIG. 2a having a traversable feed.

In the embodiment shown in FIG. 2b, the feed 1 is positioned at the side of the cutting head 5 and is located in line with the cutting head. FIG. 2c shows a holding arm 2 of angled construction, the feed 1 being positioned at the side of and offset from the cutting head 5. This arrangement has the advantage already mentioned that the cutting head is easily accessible from all sides, which makes it easier to change the wire guide rollers for example. In the embodiment shown in FIG. 2d, space is additionally created next to the cutting head, since the feed 1 is traversable from the cutting head along a linear guide 21, for example on a rail, and preferably parallel to or at right angles to the axes of the wire guide rollers. The feed is also conveniently fixed at the new location by means of a clamping device (not shown).

Figure 3:
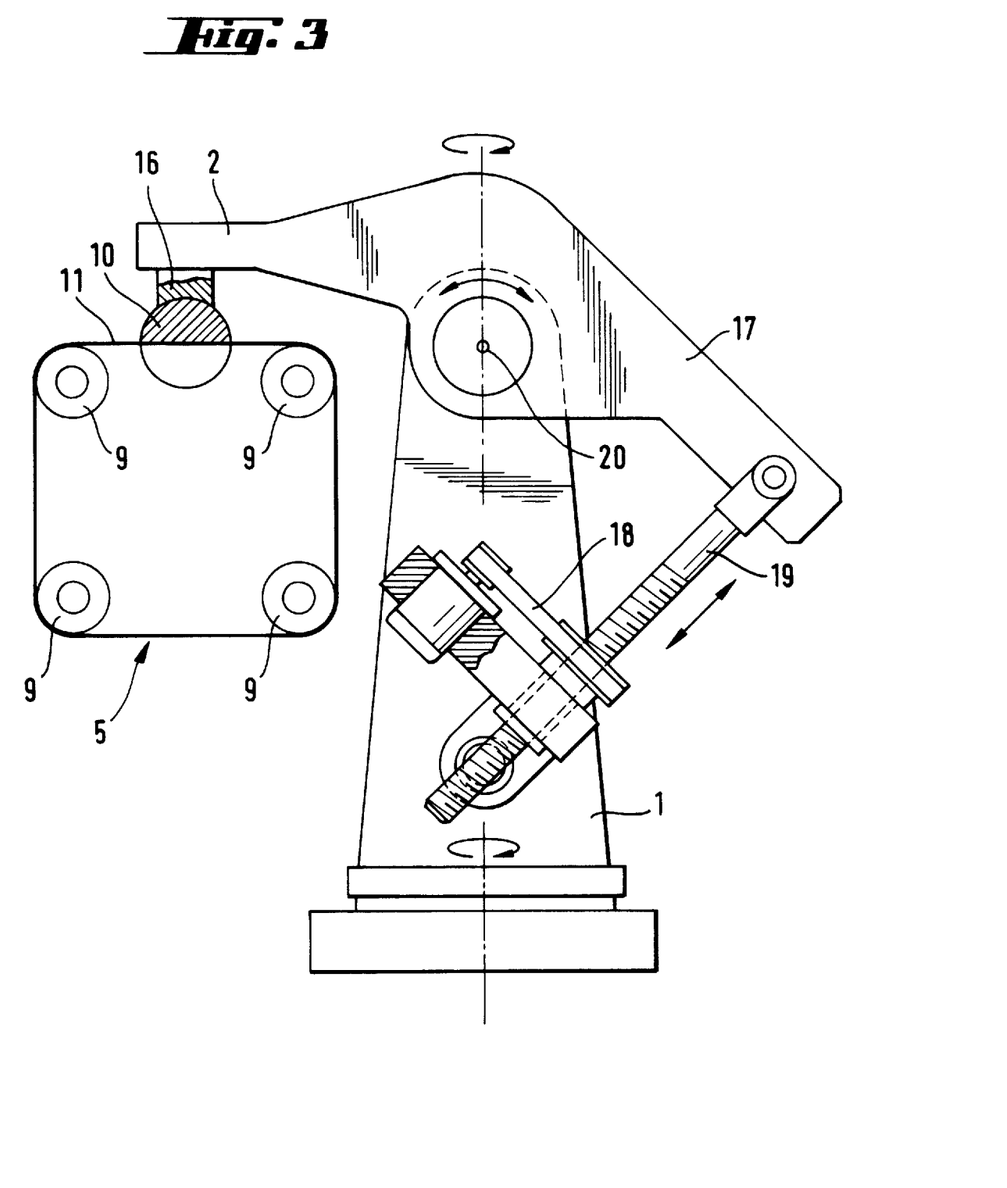
FIG. 3 shows a side view of a wire saw having a holding arm designed as a rocker.

A further embodiment of the wire saw is shown in FIG. 3. Unlike the embodiments described above, in this embodiment the workpiece 10 is guided on a circular path toward the wire web 11 of the cutting head 5. The holding arm 2 of the feed 1 is extended toward the opposite side and forms together with this extension a rocker 17 which can be moved about the pivot 20 by means of the drive 18 and via the drive spindle 19. The workpiece 10 fastened to the workholder 16 is either raised or pressed against the wire web 11 by this movement. In this embodiment, the workpiece can also be swivelled out of the position above the wire web parallel to the plane of the wire web. As indicated in FIG. 3, this may be done by the feed being disposed on a rotatable base. However, it is likewise possible to support the holding arm on a pivot bearing so that it can be swivelled independently of the rest of the feed. In addition, the feed may be designed to be traversable relative to the cutting head, as shown in the embodiment according to FIG. 2d.

Figure 4:
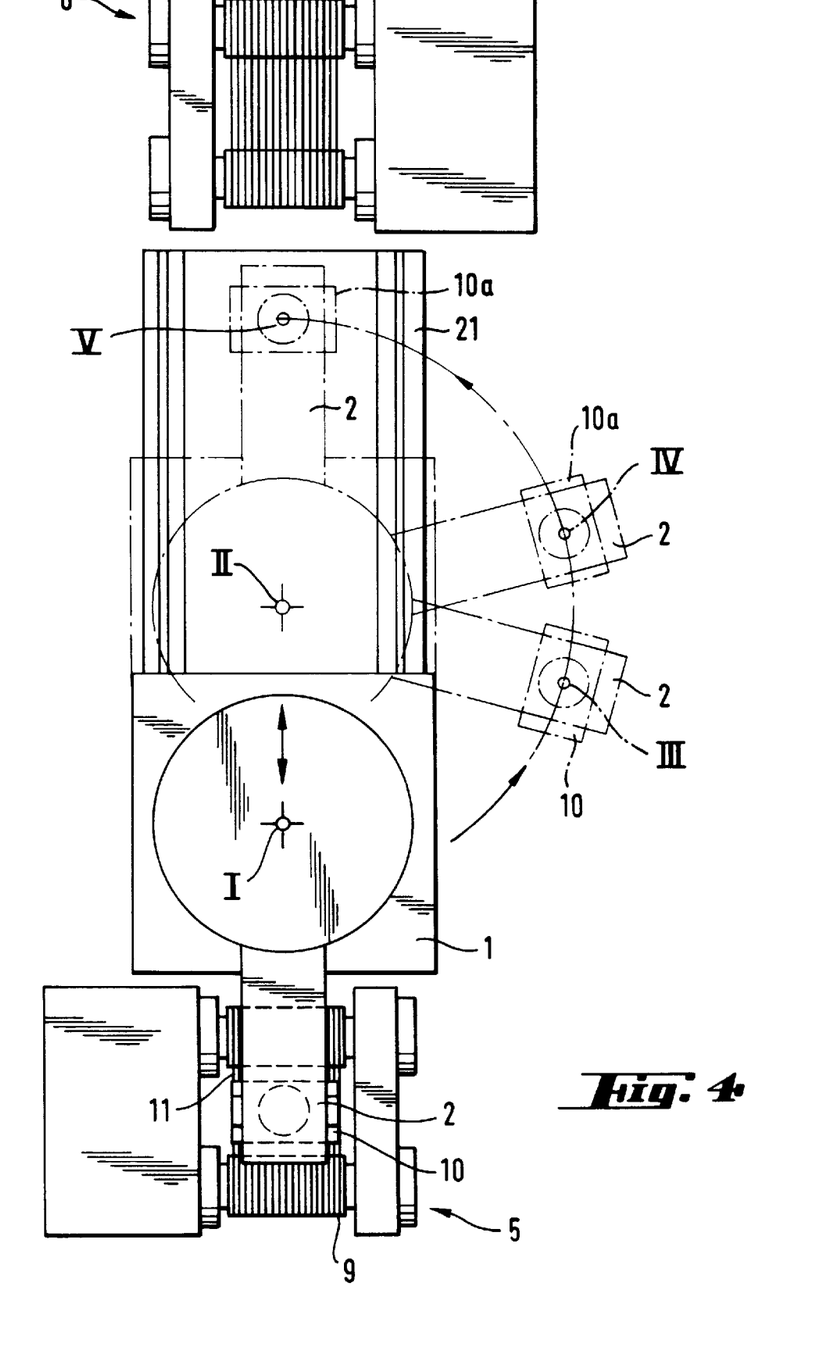
FIG. 4 is a plan view of a wire saw having two cutting heads.

FIG. 4 shows a further embodiment of the invention in which a wire feed is equipped with two cutting heads. FIG. 4 shows a diagrammatic sketch in which only the features required for understanding the functional principle of the wire saw are shown. It also serves to explain the sawing method according to the invention.

Each cutting head 5 and 6 is located in a space which is alternately utilized as sawing station and setting-up station. Positioned between the cutting heads is a feed 1 which is traversable from one cutting head to the opposite cutting head via a linear guide 21. While the one cutting head 5 is in current use operation, the other cutting head 6 is prepared for its next or future use.

A change of workpiece is effected according to the invention by the holding arm 2 being swivelled out of a sawing position above the wire web into a deposit position and from the deposit position into a pick-up position and back into a sawing position, in which case a workpiece already sawed is deposited in the deposit position and a workpiece to be sawed is picked up in the pick-up position. In the case of a wire saw having one cutting head, the sawing position into which the holding arm swivels after a new workpiece is picked up is of course the position above the wire web, utilized as the sawing tool, of this cutting head. In the case of a wire saw having two cutting heads, this is the position above a wire web of one of the cutting heads, depending on whether a change of cutting head is also intended after the change of workpiece.

During a combined change of workpiece and cutting head, the feed 1 with the holding arm 2 is displaced from the sawing position I (FIG. 4) into a position II in the center between the two cutting heads. The holding arm 2 then swivels into the deposit position III, the clamping of the workholder being released and the workpiece being deposited in a container which is filled, for example, with a cleaning liquid. The holding arm swivels further from the deposit position into the pick-up position IV and takes over the workpiece 10a to be sawed, which is preferably provided by an automatic infeed device. The holding arm then swivels further to the position V, from which it reaches the sawing position above the wire web of the other cutting head by displacement of the feed. If need be, a movement in the vertical direction may also be superposed on the swivelling movement of the holding arm. It is preferable for each cutting head 5 or 6 to have a supply of auxiliary sawing medium and a separate collecting tank for used auxiliary sawing medium.

Figure 5:
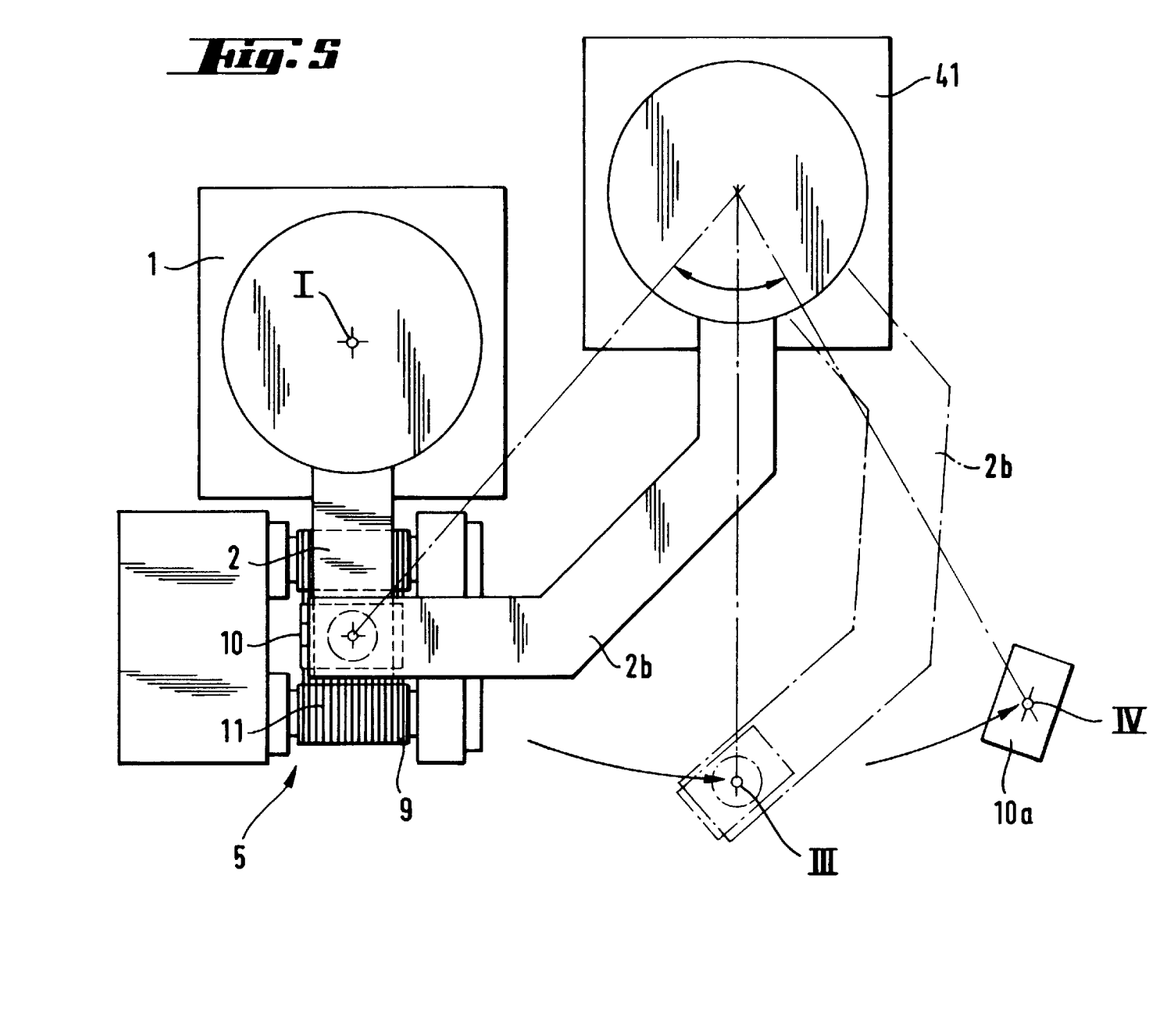
FIG. 5 shows a plan view of a wire saw and a manipulator for simplifying the change of workpiece.

FIG. 5 shows another embodiment also useful for the changing of a workpiece. The method of FIG. 5 is applicable to both wire saws according to the invention and wire saws of known type of construction. To carry out the method, a manipulator 41 is provided which is arranged laterally next to the feed 1 and has a swivelling holding arm 2b which preferably can also be raised and lowered. For changing of the workpiece, the holding arm 2b takes over the workpiece 10 from the holding arm 2 and transports it out of the sawing position above the wire web into the deposit position III, in which the workpiece is released from the holding arm and deposited. The new workpiece 10a is picked up by the holding arm 2b in the pick-up position IV and is taken from there into the sawing position and transferred to the holding arm 2 of the wire saw.

Figure 6:
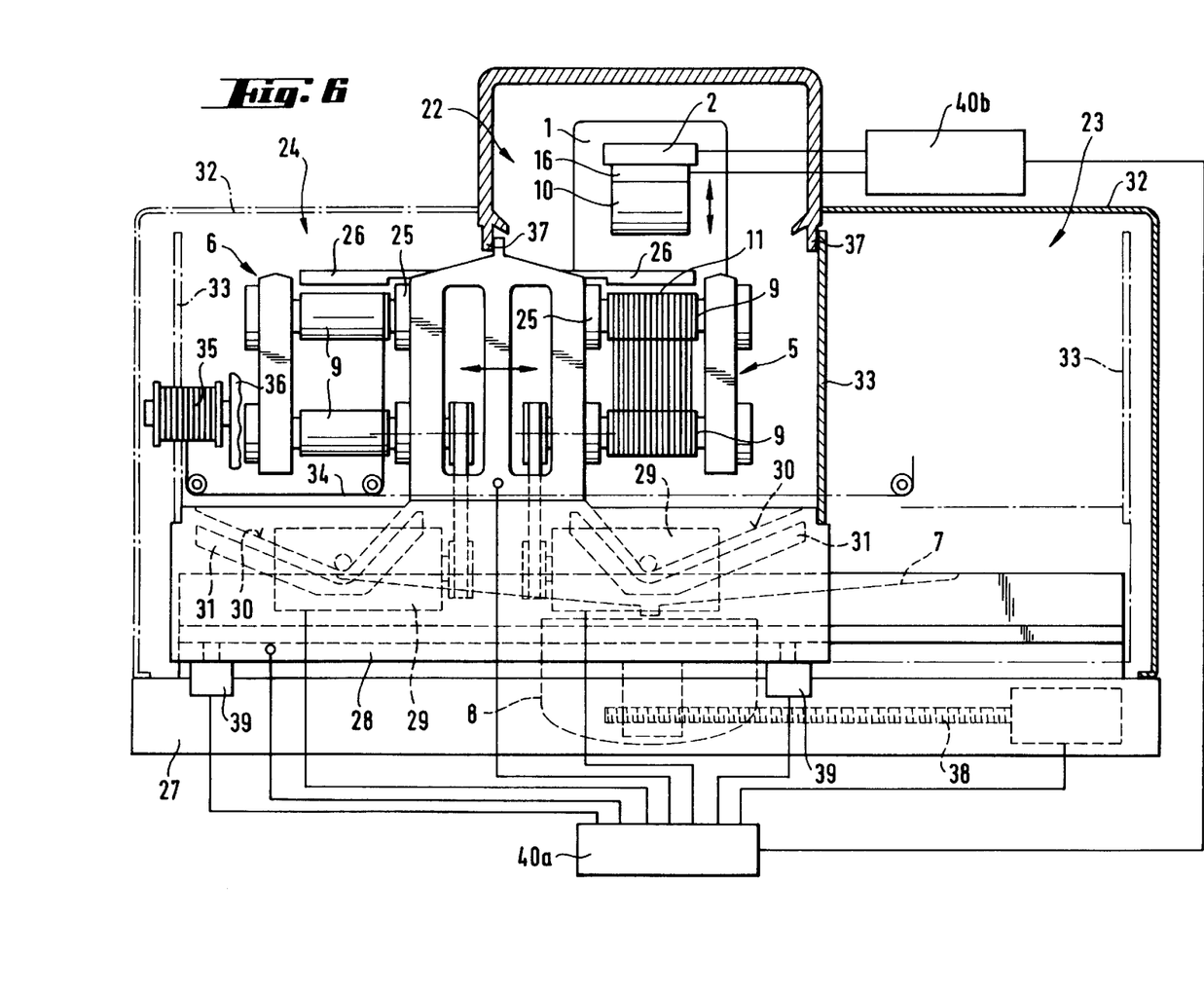
FIG. 6 shows the side view of a wire saw which is also equipped with a second cutting head.

FIG. 6 shows another embodiment of a wire saw, which is equipped with two cutting heads 5 and 6. While the one cutting head 5 together with the feed 1 is being used in the sawing station 22 for machining a workpiece 10, the other cutting head 6 is being prepared for use in a setting-up spool station 24. A finite wire which is unwound from a supply spool and wound onto a pick-up spool runs around the cutting head which is in operation. The preparation of a cutting head includes, for example, the putting in place of a new wire 34 or maintenance work such as the change of wire guide rollers 9 or their bearings 25 or the cleaning and adjustment of the discharge nozzles 26 for the auxiliary sawing medium. The two cutting heads 5 and 6 are mounted on a base frame 28 displaceable relative to a fixed mount 27. A separate motor 29 is available for each cutting head, which motor 29 can drive the corresponding wire guide rollers for machining a workpiece or for putting in place a new wire. Each cutting head also preferably has a separate trough 30 in which the auxiliary sawing medium is collected. The auxiliary sawing medium flowing off from a cutting head is fed via channels 7 to the collecting tank 8. Provided below the troughs 30 are hollow spaces 31 in which a cooling liquid circulates. The temperature regulation of the base frame is intended to counteract thermal expansions which are caused by the auxiliary sawing medium, which is heated during the sawing operation. The side covers 32 and 33 of the setting-up stations 23 and 24 are designed to be removable so that the cutting heads are readily accessible.

The wire supply required for putting in place a new saw wire is wound up on the wire spool 35. The wire spool is coupled to a drive system 36 which rotates as a function of the rotational speed of the wire guide rollers and feeds the wire in a controlled manner under the pretension for placing it on the wire guide rollers.

To change the cutting head, the sawing operation is briefly interrupted. If need be, the feed is moved a short distance away from the cutting head. Then the saw wire of the cutting head to be exchanged is wound onto a take-up spool or is cut and completely removed from the cutting head, and the base frame 28 with the two cutting heads is displaced and in fact in such a way that the one cutting head 5 passes from the sawing station 22 into the free setting-up station 23, and the other, prepared cutting head 6 passes simultaneously into the sawing station 22. In the process, the overlapping edges 37, which are preferably lined with sealing lips, close the sawing station and the adjoining setting-up station. The base frame 28 is preferably displaced along a linear guide by means of a motor-driven spindle system 38. In principle, however, a rotary plate may also be provided as base frame and the change of the cutting heads may be effected by rotation of the rotary plate. Releasable clamping devices 39 ensure that displacements of the cutting heads during the sawing operation are impossible. As soon as the prepared cutting head is located in the sawing station, the wire spool can be mounted on the unwinding spindle provided, which is active during the sawing operation, and the free wire end originating from the putting in place of the wire can be fastened to the take-up spool provided.

In a preferred further development of the invention, the wire saw, as shown in exemplary fashion in FIG. 6, is coupled to a control unit 40a and 40b which coordinates all sequences of motion and thereby permits a high degree of automation of the sawing method. Thus it is especially of advantage if the movements of the feed, the feed guide, the holding arm, the cutting head (cutting heads), the drive of the wire guide rollers and if need be, the manipulator are induced automatically. The preferably mechanical, hydraulic or pneumatic clamping devices for the feed, the holding arm, the workholder and the base frame are likewise also preferably activated and released automatically by the control unit.

Figure 7:
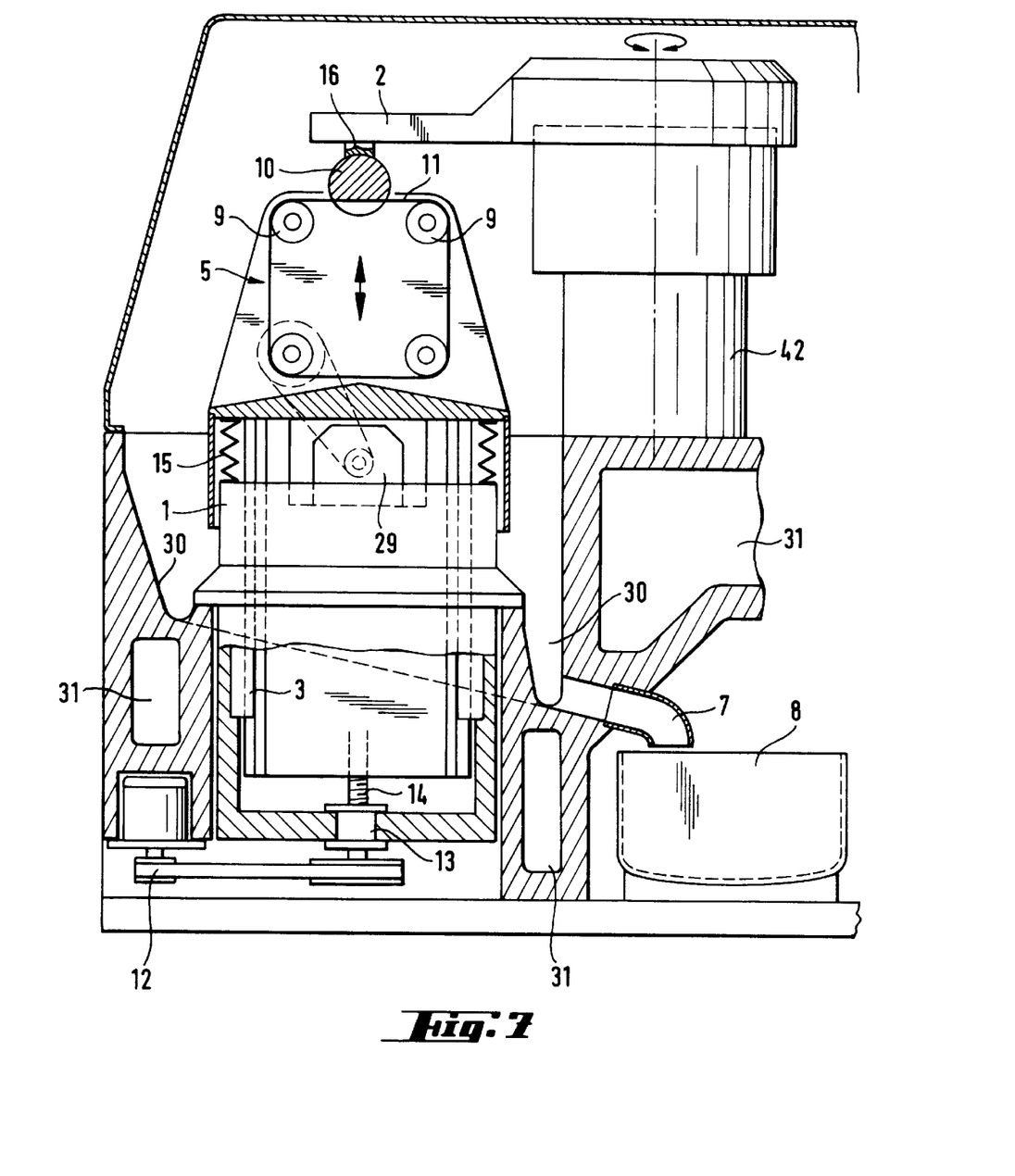
FIG. 7 shows a side view of a wire saw having a feed moving the cutting head.

The present invention also includes a wire saw according to FIG. 7 having a feed 1 which guides the cutting head 5 with the wire web 11 toward the workpiece 10. In this embodiment, the space below the cutting head is utilized not only for the trough 30 and the channel 7 for the disposal of auxiliary sawing medium into the collecting tank 8 but also for accommodating the feed 1. The feed guide 3 is designed as a linear guide and can be raised and lowered axially by means of the drive 12 and the spindle 14 mounted in the bearing 13. In this case, the cutting head 5 and the drive motor 29 for the wire guide rollers 9 are also moved in the arrow direction. The bellows 15 protect the feed guide 3 from contamination by auxiliary sawing medium. The wire saw preferably has a plurality of cooling passages 31 in which a cooling liquid circulates during the sawing operation in order to avoid unfavorable thermal expansions of the wire-saw parts. The holding arm 2 carrying the workpiece 10 is mounted in a rotatable and preferably liftable and lowerable manner on a pedestal 42 and can be swivelled parallel to the wire web 11. The pedestal is arranged laterally next to the cutting head, if need be also opposite the front ends of the wire guide rollers, and if need be is traversable, for example in the same way as the feed 1 in FIG. 2d. In a preferred embodiment, the pedestal 42 is designed as a feed, for example as feed 1 having a linear guide according to FIG. 2a or as feed 1 having a rocker according to FIG. 3.

While several embodiments of the present invention have been shown and described, it is to be understood that many changes and modifications may be made thereunto without departing from the spirit and scope of the invention as defined in the appended claims.

What is claimed is:

1. A wire saw for cutting off slices from a workpiece comprising
    a cutting head having a side and said cutting head containing a plurality of wire guide rollers and around which a multiplicity of wire sections lying parallel to one another and forming a plane wire web are moved;
    a feed for guiding the workpiece from above toward the wire web;
    the feed comprising a holding arm carrying the workpiece, said feed being located at the side of the cutting head and said holding arm swivelling the workpiece in a horizontal plane parallel to the wire web; and
    means for supplying an auxiliary sawing medium to the wire saw.

2. The wire saw as claimed in claim 1,
    wherein the holding arm carries a second workpiece which is guided toward a second wire web.

3. The wire saw as claimed in claim 1,
    wherein a second feed is provided at the side of the cutting head; and
    said second feed having a holding arm which carries a second workpiece and can be swivelled parallel to a second wire web.

4. The wire saw as claimed in claim 1,
    wherein the feed comprises a linear feed guide.

5. The wire saw as claimed in claim 1,
    wherein the holding arm is a rocker which guides the workpiece on a circular path toward the wire web.

6. The wire saw as claimed in claim 1,
    wherein the feed is arranged at the side of, and is offset from, the cutting head.

7. The wire saw as claimed in claim 1, further comprising means for moving the feed toward the cutting head and away from the cutting head.

8. The wire saw as claimed in claim 1, further comprising means for moving the cutting head toward the feed and away from the feed.

9. The wire saw as claimed in claim 1, comprising
    a second cutting head which is used alternately with a first cutting head for cutting off slices.

10. The wire saw as claimed in claim 1, comprising
    a control unit which automatically controls all sequences of motion.

11. A wire saw for cutting off slices from a workpiece comprising
    a cutting head having a side and said cutting head containing a plurality of wire guide rollers and around which a multiplicity of wire section lying parallel to one another and forming a plane wire web are moved;
    a holding arm carrying the workpiece, said holding arm swivelling the workpiece in a horizontal plane parallel to the wire web;
    a feed, by means of which the wire sections of the wire web cut through the workpiece;
    means for supplying an auxiliary sawing medium to the wire saw; and
    the feed having a feed guide which guides the cutting head with the wire web towards the workpiece.

12. The wire saw as claimed in claim 11, comprising
    a second feed; and
    the holding arm is part of said second feed which is located at the side of the cutting head.

13. A method of cutting off slices from a workpiece by means of a wire saw having a cutting head, said cutting head having a side and containing a plurality of wire guide rollers and around which a multiplicity of wire sections lying parallel to one another and forming a plane wire web are moved, and a feed, by means of which the wire sections of the wire web cut through the workpiece while an auxiliary sawing medium is supplied, wherein, for the purpose of a change of workpiece comprising the steps of
    transporting the workpiece by a holding arm carrying the workpiece from a sawing position above a wire web into a deposit position;
    releasing the workpiece from the holding arm in the deposit position;
    picking up a new workpiece from a pick-up position by the holding arm; and
    transporting the new workpiece in a horizontal plane by the holding arm into the sawing position above the wire web.

14. The method as claimed in claim 13, comprising
    depositing the workpiece released from the holding arm into a container filled with a liquid.

15. The method as claimed in claim 13,
    wherein the holding arm is part of the feed and the feed is arranged at the side of the cutting head.

16. The method as claimed in claim 13,
    wherein the holding arm is part of a manipulator which is arranged at the side of the cutting head.

17. The method as claimed in claim 13, comprising
    automatically controlling all sequences of motion.

18. A method of cutting off slices from a workpiece by means of a wire saw having a cutting head, which contains a plurality of wire guide rollers and around which a multiplicity of wire sections lying parallel to one another and forming a plane wire web are moved, and a feed, by means of which the wire sections of the wire web cut through the workpiece while an auxiliary sawing medium is supplied, comprising the steps of using one cutting head and a second cutting head alternately for cutting off slices; and preparing the cutting head not in use for future use while the second cutting head is in current use.

19. The method as claimed in claim 18, comprising automatically controlling all sequences of motion.

20. The method as claimed in claim 13,
wherein said transporting of the new workpiece is by the holding arm swivelling the workpiece in a horizontal plane parallel to the wire web and into the sawing position above the wire web.

\* \* \* \* \*